United States Patent
Brandt et al.

(10) Patent No.: US 10,549,639 B2
(45) Date of Patent: Feb. 4, 2020

(54) CONTROL ELEMENT FOR A MOTOR VEHICLE

(71) Applicant: GM GLOBAL TECHNOLOGY OPERATIONS LLC, Detroit, MI (US)

(72) Inventors: Peter Brandt, Ruesselsheim (DE); Aydin Kaya, Darmstadt (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 192 days.

(21) Appl. No.: 15/867,828

(22) Filed: Jan. 11, 2018

(65) Prior Publication Data
US 2018/0201135 A1    Jul. 19, 2018

(30) Foreign Application Priority Data

Jan. 11, 2017    (DE) .......................... 10 2017 000 159

(51) Int. Cl.
*B60K 37/06*    (2006.01)
*G06F 3/044*    (2006.01)
*G06F 3/01*    (2006.01)

(52) U.S. Cl.
CPC .............. *B60K 37/06* (2013.01); *G06F 3/016* (2013.01); *G06F 3/044* (2013.01);
(Continued)

(58) Field of Classification Search
CPC .. B60K 37/04; B60K 37/06; B60K 2370/152; B60K 2370/164; B60K 2370/52; B60K 2370/1438; B60K 2370/139; B60K 2370/12; B60K 2370/115; B60K 2370/1434; B60K 2370/1446; G06F 2203/04804; G06F 3/044
See application file for complete search history.

(56) References Cited

U.S. PATENT DOCUMENTS

2009/0174672 A1 * 7/2009 Schmidt ................. G06F 3/016
                                                    345/173
2009/0244017 A1   10/2009 Pala
(Continued)

FOREIGN PATENT DOCUMENTS

| DE | 102010026910 A1 | 8/2011 |
| DE | 102011003512 B3 | 6/2012 |
| DE | 102013018829 A1 | 5/2015 |

OTHER PUBLICATIONS

U.S. Appl. No. 62/343,453, filed May 2016, Rosenberg; Ilya Daniel.*

Primary Examiner — Priyank J Shah
(74) Attorney, Agent, or Firm — Lorenz & Kopf, LLP

(57) ABSTRACT

A control element for a motor vehicle provides a palpable response when touched. The control element includes a sensor, a touch-sensitive surface, which when touched causes the sensor to respond. An inert surface surrounds the touch-sensitive surface, which when touched does not cause the sensor to respond. An actuator is disposed between the touch sensitive surface and the inert surface and includes two components that can move relative to each other. One component is connected with the touch-sensitive surface, and the other component is connected with the inert surface. The actuator drives a motion of the touch-sensitive surface relative to the inert surface once a contact has been acquired.

19 Claims, 2 Drawing Sheets

(52) U.S. Cl.
CPC ............... *B60K 2370/1438* (2019.05); *B60K 2370/1468* (2019.05); *B60K 2370/152* (2019.05); *B60K 2370/158* (2019.05); *B60K 2370/52* (2019.05)

(56) References Cited

U.S. PATENT DOCUMENTS

| | | |
|---|---|---|
| 2010/0060437 A1 | 3/2010 | Steckel et al. |
| 2010/0238132 A1* | 9/2010 | Schmidt ................ G06F 3/016 345/173 |
| 2016/0062505 A1* | 3/2016 | Hwang ................ G06F 3/0412 345/174 |
| 2017/0285848 A1* | 10/2017 | Rosenberg ............ G06F 3/016 |
| 2019/0033973 A1* | 1/2019 | Vogt ........................ G05G 5/03 |

\* cited by examiner

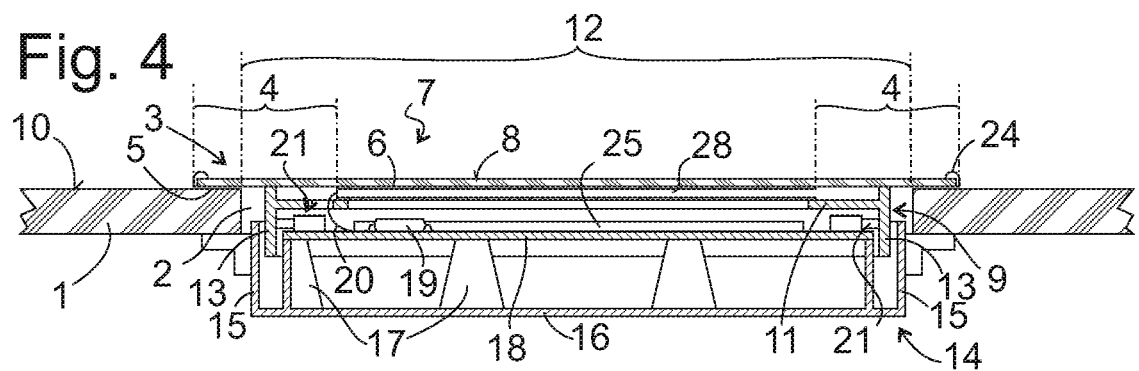
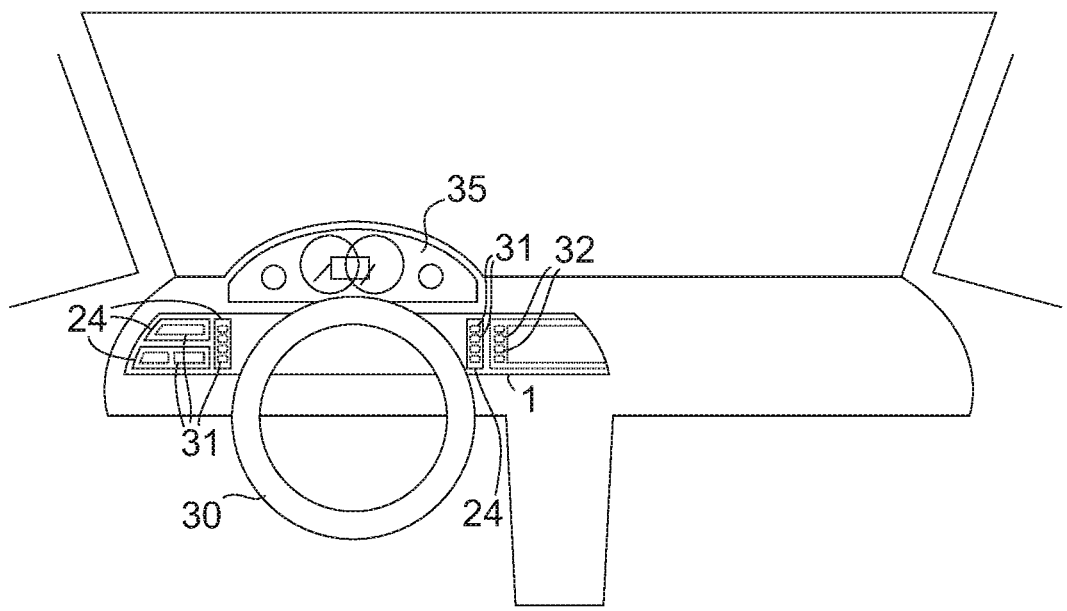

CONTROL ELEMENT FOR A MOTOR VEHICLE

CROSS-REFERENCE TO RELATED APPLICATION

This application claims priority to German Patent Application No. 102017000159.6, filed Jan. 11, 2017, which is incorporated herein by reference in its entirety.

TECHNICAL FIELD

This application pertains to a control element for use on a dashboard of a motor vehicle.

BACKGROUND

Control elements that acquire a movement through electromagnetic interaction are robust as well as easy and inexpensive to manufacture, since they have no keys that would have to be able to reproducibly move between a resting position and switching position. This also makes them interesting for use in motor vehicles.

However, one disadvantage to control elements without mechanically moveable components is that a user cannot recognize whether a surface touched by the user was perceived by the control element since the surface does not yield in response to the touch. DE 10 2008 046 102 A1 (also published as US 2010/060437) proposes a solution to this disadvantage by providing a control element furnishing a trim or molded part of a vehicle interior with one or more sensor elements and oscillator coils or exciters. The oscillator coils excite the trim or molded parts to vibrate or oscillate when contact by a sensor element has been acquired. To enable a user in a driving vehicle to perceive these oscillations, they must be strong enough to be differentiated from the oscillations caused by the moving vehicle. This requires a relatively large, strong oscillator coil.

SUMMARY

In accordance with the present disclosure a control element with a touch-sensitive surface is provided in which a relatively small, weak actuator is sufficient for driving the touch-sensitive surface toward such a perceivable motion once a contact has been acquired.

In an embodiment of the present disclosure, a control element includes a sensor and a first member covering the sensor and having a first surface including a touch-sensitive region for triggering the sensor when touched. A second member surrounds the first member and has a second surface, which is inert such that the sensor does not trigger the sensor when touched. An actuator includes a first component operably coupled to the first member and a second component operably coupled to the second member. The first and second components are configured to move relative to each other for driving a motion of the first surface relative to the second surface when the sensor is triggered. In this way, the motion induced by the actuator can locally be largely confined to the surface that the user must actually touch to make the sensor respond. Attenuation of the motion can be kept low, so that a small, inexpensive actuator is sufficient for bringing about such a palpable motion.

In order to achieve a locally sharp demarcation of the touch-sensitive surface, the sensor should be placed as tightly as possible thereunder. For this purpose, the sensor is preferably arranged in an opening of the inert surface, and the touch-sensitive surface is part of a plate that covers the opening and an edge of the inert surface adjoining the opening. Apart from the contact for triggering the sensor, the plate is not subjected to any static loads, so that its wall thickness can be minimal, and in particular clearly smaller than that of a component that makes up the inert surface. The wall thickness of the plate preferably measures under 0.25 mm, or even under 0.1 mm.

An outer edge of the plate can be reinforced by a bead. This bead can on the one hand contribute to reinforcing the plate, in particular given a very thin wall thickness, and on the other help conceal a height differential between the exterior side of the plate and the inert surface surrounding it. In addition, it can visibly and palpably mark the position of the touch-sensitive surface. The bead is preferably adhesively bonded to an exterior side of the plate facing away from the inert surface.

The sensor is preferably a capacitive sensor. While the plate should be nonconductive—at least for a capacitive sensor—so as not to shield the electromagnetic field of the sensor, the bead can be metallic or at least metallized on a visible side. Such a bead is interesting not only from creative standpoints, but can also contribute to minimizing acquisition errors given a control element with several sensors by shielding the electromagnetic fields of the sensors from each other.

An edge of the plate overlapping the inert surface can abut against the inert surface in order to prevent an edge of the plate overlapping the inert surface from being bent, broken or damaged in some other way during use.

The edge of the plate may also be touch-insensitive, In this way, an inadvertent activation of the control element, for example if the hand of the driver brushes over the inert surface while looking for the touch-sensitive surface and touches the edge of the plate in the process.

The motion induced by the actuator should be an oscillation in a direction parallel to the touch-sensitive surface in order to prevent the plate and inert surface from striking against each other.

Touch-sensitive surfaces of several sensors can be distributed on the same plate in order to enable the control of several functions via the same control element. Each of these touch-sensitive surfaces may also be separated from each other by an insensitive intermediate area In order to avoid unintended activations. However, the inert surface may have several openings, which each are covered by a plate having a touch-sensitive surface.

BRIEF DESCRIPTION OF THE DRAWINGS

The present disclosure will hereinafter be described in conjunction with the following drawing figures, wherein like numerals denote like elements.

FIG. 4 is a section analogous to FIG. 1 according to a further development; and

FIG. 5 is a schematic view of a dashboard according to the present disclosure.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
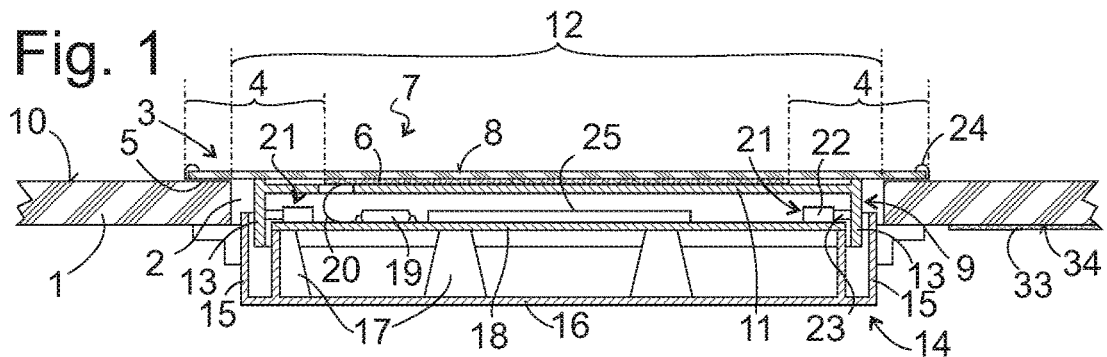
FIG. 1 is a schematic section through a control element.

FIG. 1 presents a cross section through the control element according to the present disclosure. An opening 2 is cut into a base plate 1, which may include part of the dashboard of a motor vehicle. A cover plate 3 covering the opening 2 is arranged on the exterior side of the base plate 1 facing the user. An outer edge or marginal region 4 of the cover plate 3 is loosely placed on an edge or marginal region 5 of the carrier plate 1 that envelops the opening 2. The carrier plate 1 and cover plate 3 consist of the same dielectric material. The material is preferably transparent or translucent, such as a mineral or art glass, and the internal sides of the plates 1, 3 facing away from the user are covered by an opaque decorative layer of the same color.

A capacitor plate 6 of a capacitive sensor 7 extends under the decorative layer of the cover plate 3. The edges of the capacitor plate 6 define the boundaries of a touch-sensitive surface 8 on the external side of the cover plate 3, the touching of which by the finger of the user the capacitive sensor 7 is designed to acquire. The base plate 1 forms an inert surface 10, the touching of which does not cause the sensor to respond.

For example, a base frame 9 injection molded out of plastic includes a support plate 11, which supports the core area 12 of the cover plate 3 extending over the opening 2 on nearly its entire expansion, as well as webs 13, which extend from the edges of the support plate 11 through the opening 2. Since the cover plate 3 is thus supported on nearly its entire expansion, its selected wall thickness can be relatively thin, e.g., 70 μm.

Mounted on the internal side of the base plate 1 is a housing 14 in the form of a flat, square box that is open on its side facing the base plate 1. Lateral walls 15 of the housing 14 are secured to the internal side of the base plate 1 all around the opening 2. Supports 17 projecting upwardly from a floor 16 of the housing 14 carry a circuit board 18, on which an evaluation circuit 19 of the capacitive sensor 7 is mounted. The evaluation circuit 19 is connected with the capacitor plate 6 by a flexible flat cable 20.

The circuit board 18 is connected with the cover plate 3 by at least one, preferably two actuators 21. The actuators 21 each have two components 22, 23 that can move relative to each other, one of which is mounted on the circuit board 18, and the other of which acts on the base frame 9. For example, the component 22 on the side of the circuit board 18 can be an oscillator coil, while the component 23 on the side of the base frame is a coil core that engages into the oscillator coil.

The actuators 21 are here arranged in such a way as to drive an oscillation motion parallel to the surfaces of the base plate 1 and cover plate 3.

They are arranged on mutually opposing edges of the circuit board 18, and each actuated with a phase shift of 180° relative to each other, i.e., while the one actuator 21 draws the web 13 facing it toward the circuit board 18, the other one presses its own away from the circuit board 18.

The outer edges of the cover plate 3 are reinforced by a continuous bead 24 included of wire or a metal-coated plastic. The bead 24 hides the slight difference in height between the external sides of the base plate 1 and the cover plate 3, thereby creating the impression for the impartial observer that there exists only a single, integral, flat surface, on which the adhesively bonded bead 24 frames the touch-sensitive surface 8.

A lamp 25 can additionally be mounted on the circuit board 18, and through a window of the support plate 11 illuminates a logo 26 cut into the opaque decorative layer (see FIG. 2) or a symbol that denotes the function of the control element.

Figure 2:
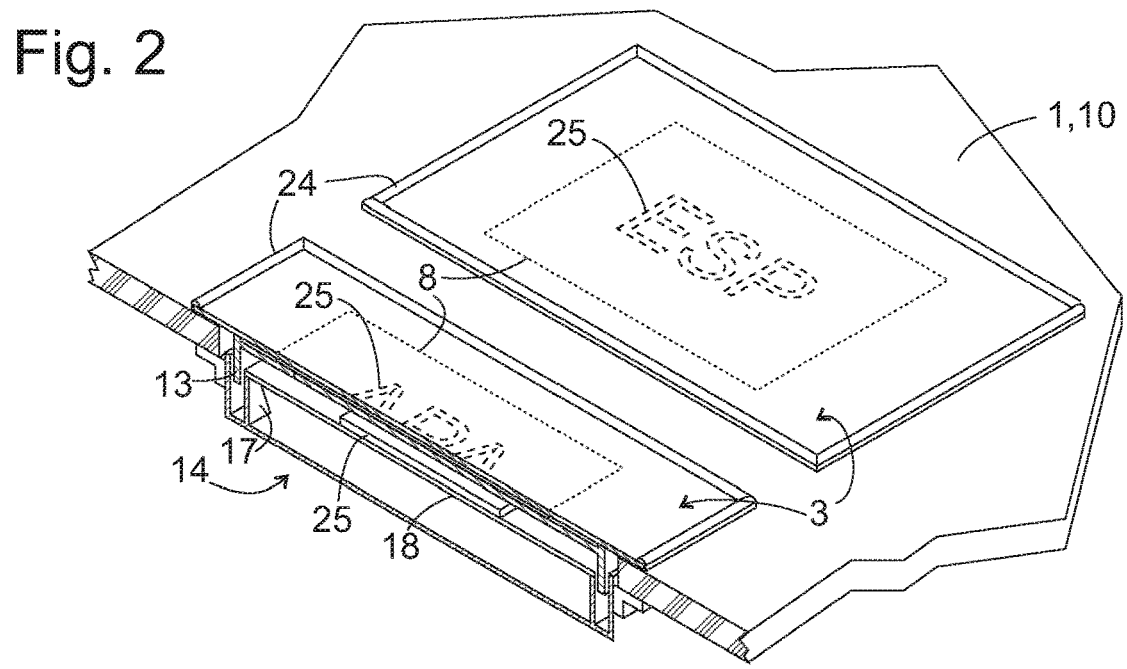
FIG. 2 is a perspective view of a first variant of the control element.

FIG. 2 presents an in part sectional, in part perspective view of a control element according to a first modification of the present disclosure. The base plate 1 here has several openings 2, which each are covered by a separate cover plate 3. The sensors 7 and actuators 21 arranged behind each cover plate 3 can be mounted on a shared circuit board 18, and have a shared housing 14.

Figure 3:
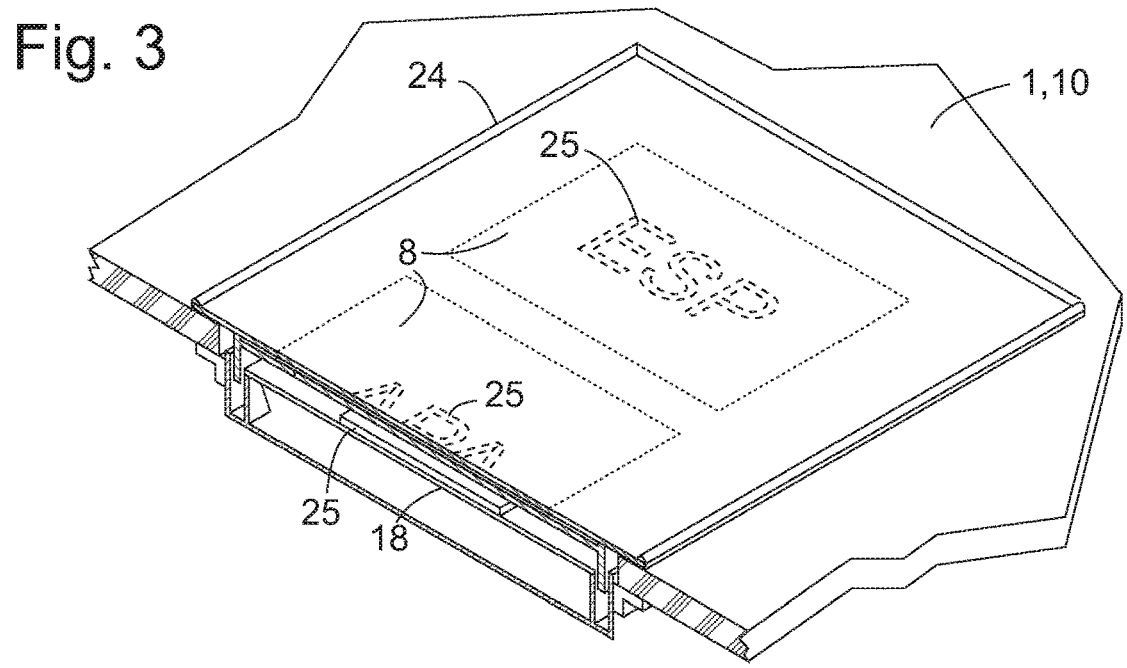
FIG. 3 is a perspective view of a second variant.

The modification on FIG. 3 is simpler and more cost effective. The touch-sensitive surfaces 8 of several sensors are here distributed over a shared cover plate 3. Because the number of actuators 21 required to make the cover plate 3 oscillate does not rise with the number of sensors, fewer actuators 21 than in the case of FIG. 2 are sufficient. In order to prevent several sensors from responding simultaneously, the touch-sensitive surfaces 6 are separated from each other by insensitive intermediate areas 27. The intermediate area 27 on FIG. 3 are flat and flush with the touch-sensitive surfaces 8; in order to create a clearly visible separation between the touch-sensitive surfaces 8 of different sensors 7, a respective bead 24 could also be secured along the insensitive intermediate areas 27.

FIG. 4 presents a section analogous to FIG. 1 according to a further development of the present disclosure. Components that correspond to those already described with reference to FIG. 1 are labeled with the same reference numbers there, and will not be explained again. The opaque layer is here at least locally replaced by an LCD display 28, which is mounted under the cover plate 3. Because the LCD display 28 makes it possible to display any alphanumeric or graphic symbols, it permits the use of one and the same touch-sensitive surface 8 for controlling various functions indicated by the respective LCD display 28.

A lamp could be directly integrated into the LCD display 28. In the case shown here, the lamp 25 mounted on the circuit board 18 is provided as a background illumination for the LCD display 28, so as to minimize the weight of the components made to oscillate by the actuators 21.

A transparent electrode covering the entire LCD display 28 can here serve as the electrode plate 6. If the LCD display 28 is a touchscreen, spatially resolving, touch-sensitive electrodes known to be present on its surface can assume the function of the electrode plate 6; in such a case, the touchscreen can form the touch-sensitive surfaces 8 of several sensors distributed over the shared cover plate 3 according to FIG. 3, wherein both the number of sensors and the contours of their touch-sensitive surface 8 can be varied by program control.

FIG. 5 shows a dashboard 29 of a motor vehicle from the perspective of a vehicle passenger. A base plate 1 with control elements distributed thereon extends on either side of the rotational axis of a steering wheel 30. Some of the control elements marked 31 are included of sensors 7 as described above, one or several of which are arranged behind a cover plate that covers an opening of the base plate 1 and is framed by a bead 24; the sensors of other control elements 32 have capacitor plates 33, which as depicted on FIG. 1 are secured to the surface 34 of the base plate 1 lying opposite the surface 10. The surface 10 is thus not inert in each and every respect; it represents an inert surface only for the sensor 7 arranged in the opening 2 in the sense that the sensor 7 does not respond to the surface 10 being contacted;

the sensors of the control elements 32 arranged directly behind this surface 10 do so very well.

A large-surface indicating instrument 35 is arranged in the usual manner in the upper area of the dashboard 29, so that it is visible in the viewing field of the driver above the steering wheel 30 or through a central opening of the steering wheel 30. The indicating instrument 35 includes several indicating elements, here for example analog pointing instruments for engine speed and velocity, or an LCD on-screen display, which are arranged behind a shared, transparent plate. This plate can be connected with the base plate 1 in an integral and flush manner.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. A control element for a motor vehicle comprising:
   a sensor;
   a first member covering the sensor and having a first surface including a touch-sensitive region for triggering the sensor when touched;
   a second member surrounding the first member and having a second surface, wherein the second surface is inert such that the second surface does not trigger the sensor when touched;
   an actuator including a first component operably coupled to the first member and a second component operably coupled to the second member, wherein the first and second components are configured to move relative to each other so as to drive a motion of the first surface relative to the second surface when the sensor is triggered; and
   a bead disposed on an external side of the first member facing away from the second member which circumscribes and reinforces an outer edge of the first member.

2. The control element according to claim 1, wherein the sensor is arranged in an opening formed in the second member and the first member covers the opening and an edge of the second surface adjoins the opening.

3. The control element according to claim 1, wherein the sensor comprises a capacitive sensor element having a capacitor plate defining the touch-sensitive region.

4. The control element according to claim 1, wherein the bead is metallic.

5. The control element according to claim 1, wherein the bead is metallized on a surface facing away from the second member.

6. The control element according to claim 1, wherein the bead is adhesively bonded to the external side of the first member facing away from the second member.

7. The control element according to claim 1, wherein a first marginal region of the first member overlaps a portion of the second surface and abuts against a second marginal region of the second member.

8. The control element according to claim 7, wherein the first marginal region comprises a touch-insensitive region surrounding the touch-sensitive region.

9. The control element according to claim 1, wherein the actuator is configured oscillate the first surface relative to the second surface in a direction parallel to a plane of the first surface.

10. The control element according to claim 1, further comprising:
    a first actuator including a first oscillator coil supported on a first side of the second member and a first coil core operably coupled to the first member; and
    a second actuator including a second oscillator coil supported on a second side second member opposite the first side and a second coil core operably coupled to the first member,
    wherein the first and second actuators are operable with a phase shift of 180° relative to each other to oscillate the first surface relative to the second surface in a direction parallel to a plane of the first surface when the sensor is triggered.

11. The control element according to claim 1, further comprising a plurality of sensors, wherein the first member is configured to cover the plurality of sensors and the first surface includes a touch-sensitive region associated with each of the plurality of sensors for triggering a respective one of the plurality of sensors when touched.

12. The control element according to claim 1, further comprising an LCD display arranged beneath at least a portion of the first surface.

13. A control element for a motor vehicle comprising:
    a plurality of sensors;
    a first member configured to cover the plurality of sensors and having a first surface including a touch-sensitive region associated with each of the plurality of sensors for triggering a respective one of the plurality of sensors when touched;
    a second member surrounding the first member and having a second surface, wherein the second surface is inert such that the second surface does not trigger the sensor when touched; and
    an actuator including a first component operably coupled to the first member and a second component operably coupled to the second member, wherein the first and second components are configured to move relative to each other so as to drive a motion of the first surface relative to the second surface when the sensor is triggered,
    wherein the second member has an opening associated with each of the plurality of sensors, wherein the first member covers all of the openings.

14. The control element according to claim 13, wherein the first surface further comprises a touch-insensitive intermediate region separating the touch-sensitive regions.

15. A control element for a motor vehicle comprising:
    a sensor having a capacitor plate, sensor circuitry for selectively triggering the sensor and a flexible cable electrically coupling the capacitor plate and the sensor circuitry;
    a first member covering the sensor and having a first surface including a touch-sensitive region for triggering the sensor when touched;
    a second member having an opening formed therein which receives the sensor and is covered by the first member, the second member having a second surface which is inert such that the second surface does not trigger the sensor when touched;

a base frame disposed in the opening and supporting a portion of the first member covering the opening such that the capacitor plate is disposed therebetween;

a housing secured to the second member opposite the second surface and supporting the sensor circuitry; and an actuator including a oscillator coil supported on the housing and operably coupled to the second member and a coil core supported on the base frame and operably coupled to the first member, wherein the actuator is operable to oscillate the first surface relative to the second surface in a direction parallel to a plane of the first surface when the sensor is triggered.

16. The control element according to claim 15, further comprising a bead disposed on an external side of the first member facing away from the second member which circumscribes and reinforces an outer edge of the first member.

17. The control element according to claim 16, wherein the first marginal region comprises a touch-insensitive region surrounding the touch-sensitive region.

18. The control element according to claim 15, wherein a first marginal region of the first member overlaps a portion of the second surface and abuts against a second marginal region of the second member.

19. The control element according to claim 15, further comprising:

a first actuator including a first oscillator coil supported on a first side of the housing and operably coupled to the second member and a first coil core supported on the base frame and operably coupled to the first member; and a second actuator including a second oscillator coil supported on a second side of the housing opposite the first side and operably coupled to the second member and a second coil core supported on the base frame and operably coupled to the first member, wherein the first and second actuators are operable with a phase shift of 180° relative to each other to oscillate the first surface relative to the second surface in a direction parallel to a plane of the first surface when the sensor is triggered.

* * * * *